United States Patent
Ryu et al.

(10) Patent No.: US 8,932,049 B2
(45) Date of Patent: Jan. 13, 2015

(54) TOP-BURNER AND COOKER COMPRISING THE SAME

(75) Inventors: Jung-Wan Ryu, Changwon (KR);
Dae-Bong Yang, Changwon (KR);
Yong-Ki Jeong, Changwon (KR);
Young-Soo Kim, Changwon (KR);
Dae-Rae Lee, Changwon (KR);
Yang-Ho Kim, Changwon (KR);
Jae-Bum Lim, Changwon (KR);
Jae-Hyuk Wie, Changwon (KR)

(73) Assignee: LG Electronics Inc., Seoul (KR)

( * ) Notice: Subject to any disclaimer, the term of this patent is extended or adjusted under 35 U.S.C. 154(b) by 1249 days.

(21) Appl. No.: 12/808,132

(22) PCT Filed: Dec. 15, 2008

(86) PCT No.: PCT/KR2008/007426
§ 371 (c)(1),
(2), (4) Date: Sep. 13, 2010

(87) PCT Pub. No.: WO2009/078647
PCT Pub. Date: Jun. 25, 2009

(65) Prior Publication Data
US 2011/0011389 A1    Jan. 20, 2011

(30) Foreign Application Priority Data

Dec. 14, 2007  (KR) .......................... 10-2007-0130657
Dec. 14, 2007  (KR) .......................... 10-2007-0130658
Dec. 14, 2007  (KR) .......................... 10-2007-0130659
Dec. 14, 2007  (KR) .......................... 10-2007-0130664
Dec. 14, 2007  (KR) .......................... 10-2007-0130665
Dec. 17, 2007  (KR) .......................... 10-2007-0131870

(51) Int. Cl.
*F24C 3/08*    (2006.01)
*F23D 14/06*   (2006.01)

(52) U.S. Cl.
CPC ................ *F23D 14/06* (2013.01); *F24C 3/085* (2013.01); *F23D 2900/14062* (2013.01); *F23D 2900/14063* (2013.01); *Y02B 40/166* (2013.01)

USPC ........... 431/284; 431/354; 431/278; 431/350; 26/39 H; 26/39 R; 26/39 E

(58) Field of Classification Search
CPC ....... F23D 14/06; F23D 14/065; F23D 14/26; F23D 14/58; F23D 2900/14062; F23D 2900/14063; F23D 23/00; F24C 3/085; F24C 3/08
USPC ..... 126/39 E, 39 H, 39 R; 431/278, 284, 350, 431/354
See application file for complete search history.

(56) References Cited

U.S. PATENT DOCUMENTS 4,518,346 A *  5/1985  Pistien ........................... 431/266
4,565,523 A *  1/1986  Berkelder ...................... 431/354

(Continued)

FOREIGN PATENT DOCUMENTS

KR    10-1999-001978 A    1/1999
KR    10-1999-0031386 A   5/1999

(Continued)

*Primary Examiner* — Jorge Pereiro
(74) *Attorney, Agent, or Firm* — Birch, Stewart, Kolasch & Birch, LLP

(57) ABSTRACT

The present invention relates to a top burner and a cooker including the top burner. The present invention includes: an outer burner installed on a top surface of a top plate, and provided with a plurality of flame holes to form flames through combusting gas mixture at a perimeter thereof; an inner burner installed on a top surface of the outer burner, and provided with a plurality of flame holes to form flames through combusting gas mixture at a perimeter thereof disposed inward to the perimeter of the outer burner; a plurality of first mixing tubes supplying gas mixture mixed with air inside the outer burner; a second mixing tube supplying gas mixture mixed with air inside the inner burner; and a passage formed through the outer tube, and in which air supplied to combust gas mixture at the flame holes of the inner burner flows. Thus, according to the present invention, the advantages of heating food more efficiently while reducing incomplete combustion of gas mixture can be realized.

54 Claims, 8 Drawing Sheets

(56) References Cited

U.S. PATENT DOCUMENTS

| | | | |
|---|---|---|---|
| 4,891,006 A * | 1/1990 | Le Monnier de Gouville et al. | 431/349 |
| 5,083,915 A * | 1/1992 | Riehl | 431/264 |
| 5,277,576 A * | 1/1994 | Hartung et al. | 431/198 |
| 5,405,263 A * | 4/1995 | Gerdes et al. | 431/354 |
| 5,443,380 A * | 8/1995 | Riehl | 431/266 |
| 6,030,207 A * | 2/2000 | Saleri | 431/354 |
| 6,035,846 A * | 3/2000 | Saleri | 126/39 H |
| 6,095,802 A * | 8/2000 | Kwiatek | 431/349 |
| 6,263,868 B1 * | 7/2001 | Koch et al. | 126/39 R |
| 6,299,436 B1 * | 10/2001 | Huang | 431/354 |
| 6,325,619 B2 * | 12/2001 | Dane | 431/284 |
| 6,332,460 B1 * | 12/2001 | Paesani | 126/39 R |
| 7,001,176 B2 * | 2/2006 | Bettinzoli | 431/354 |
| 7,291,009 B2 * | 11/2007 | Kamal et al. | 431/284 |
| 7,661,954 B2 * | 2/2010 | Harneit | 431/278 |
| 7,901,205 B2 * | 3/2011 | Trochou | 431/284 |
| 8,245,703 B2 * | 8/2012 | Cadeau et al. | 126/39 E |
| 8,302,593 B2 * | 11/2012 | Cadima | 126/39 R |
| 8,464,703 B2 * | 6/2013 | Ryu et al. | 126/39 E |
| 8,535,052 B2 * | 9/2013 | Cadima | 431/354 |
| 2003/0228550 A1 * | 12/2003 | Koch et al. | 431/195 |
| 2004/0029063 A1 * | 2/2004 | Bettinzoli | 431/354 |
| 2004/0234915 A1 * | 11/2004 | Koch et al. | 431/278 |
| 2007/0154858 A1 * | 7/2007 | Cadima | 431/354 |
| 2007/0218414 A1 * | 9/2007 | Harneit | 431/354 |
| 2011/0232628 A1 * | 9/2011 | Bettinzoli | 126/39 E |

FOREIGN PATENT DOCUMENTS

| | | |
|---|---|---|
| KR | 20-1999-0014909 U | 5/1999 |
| KR | 10-0682664 B1 | 2/2007 |

* cited by examiner

Fig. 6
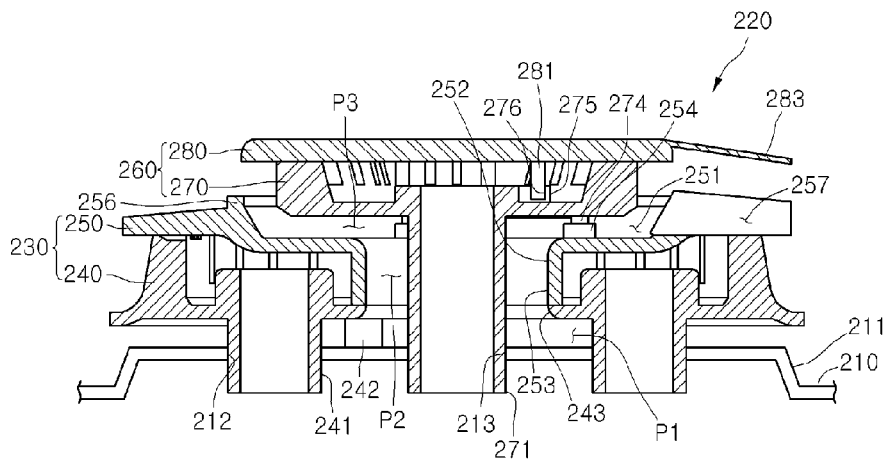
[Fig. 7]
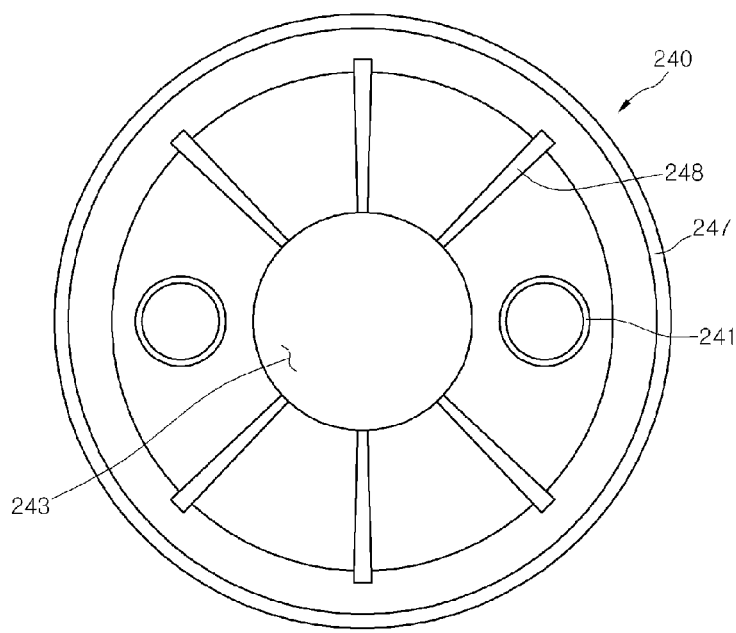
Fig. 8
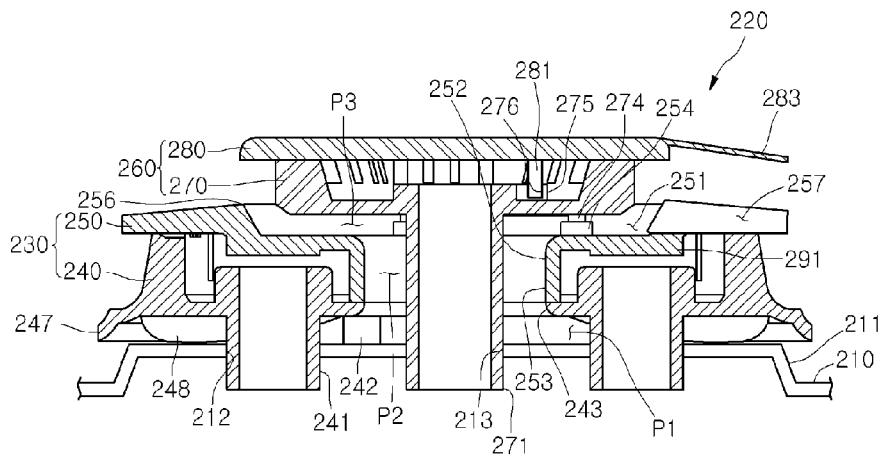

TOP-BURNER AND COOKER COMPRISING THE SAME

TECHNICAL FIELD

The present invention relates to a cooker, and more particularly, to a top burner that combusts gas to cook foods and a cooker including the top burner.

BACKGROUND ART

A cooker is a household appliance that uses gas, electricity, etc. to cook food. A cooker that uses gas is provided with a burner that combusts gas to heat a container in which food is stored to cook the food. In general, the burner includes a burner body that supplies gas, a burner head coupled to the top end of the burner body, a burner cap defining combustion holes together between the burner head, and a spark plug for igniting gas discharged through the combustion holes.

DISCLOSURE OF INVENTION

Technical Problem

An object of the present invention is to provide a top burner configured to more efficiently heat food, and a cooker including the top burner.

Another object of the present invention is to provide a top burner configured to reduce incomplete combustion of gas mixture, and a cooker including the top burner.

A further object of the present invention is to provide a top burner configured to prevent contamination by liquids in food, and a cooker including the top burner.

A still further object of the present invention is to provide a top burner configured to maintain the shapes of flames, and a cooker including the top burner.

A yet further object of the present invention is to provide a top burner configured to prevent arbitrary dislodgement of the top burner, and a cooker including the top burner.

Technical Solution

To achieve the above objects in accordance with an embodiment of the present invention, there is provided a top burner including: a first burner provided with a plurality of flame holes for forming flames through combusting gas mixture; a second burner installed on a top surface of the first burner, and provided with a plurality of flame holes for forming flames through combusting of gas mixture to be partitioned from the flames formed at the flame holes of the first burner; and a passage in which air flows for combusting gas mixture at the flame holes of the second burner.

A top burner according to another embodiment of the present invention includes: an outer burner installed on a top surface of a top plate, and provided with a plurality of flame holes to form flames through combusting gas mixture at a perimeter thereof; an inner burner installed on a top surface of the outer burner, and provided with a plurality of flame holes to form flames through combusting gas mixture at a perimeter thereof disposed inward to the perimeter of the outer burner; a plurality of first mixing tubes supplying gas mixture mixed with air inside the outer burner; a second mixing tube supplying gas mixture mixed with air inside the inner burner; and a passage formed through the outer tube, and in which air supplied to combust gas mixture at the flame holes of the inner burner flows.

A cooker according to an embodiment of the present invention includes: a top burner unit including a top plate defining a top surface exterior, a top grid provided on the top plate and on which food is placed, and any one of the top burners in any one of claims 1 to 56; and an oven unit provided below the top burner.

Advantageous Effects

According to the present invention, the advantages of heating food more efficiently while reducing incomplete combustion of gas mixture can be realized.

BRIEF DESCRIPTION OF DRAWINGS

FIG. 6 is a longisectional view of a second embodiment of a top burner according to the present invention.

FIG. 7 is a plan view of the undersurface of an outer burner head configuring the second embodiment of the present invention.

FIG. 8 is a longisectional view of a third embodiment of a top burner according to the present invention.

BEST MODE FOR CARRYING OUT THE INVENTION

Below, embodiments of a top burner and a cooker including a top burner according to the present invention will be described in detail with reference to the attached drawings.

Figure 1:
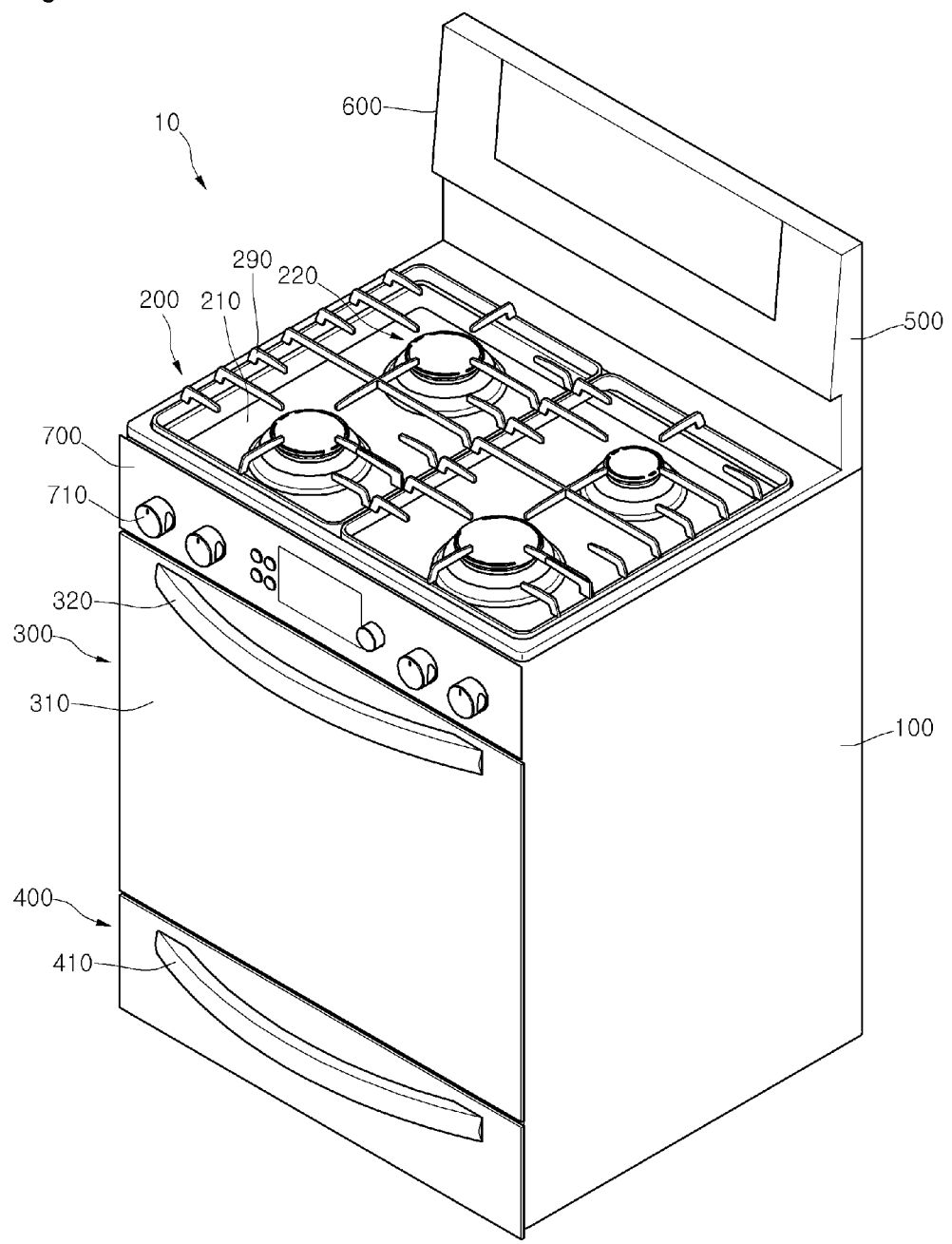
FIG. 1 is a perspective view of a cooker including a first embodiment of a top burner according to the present invention.
Figure 2:
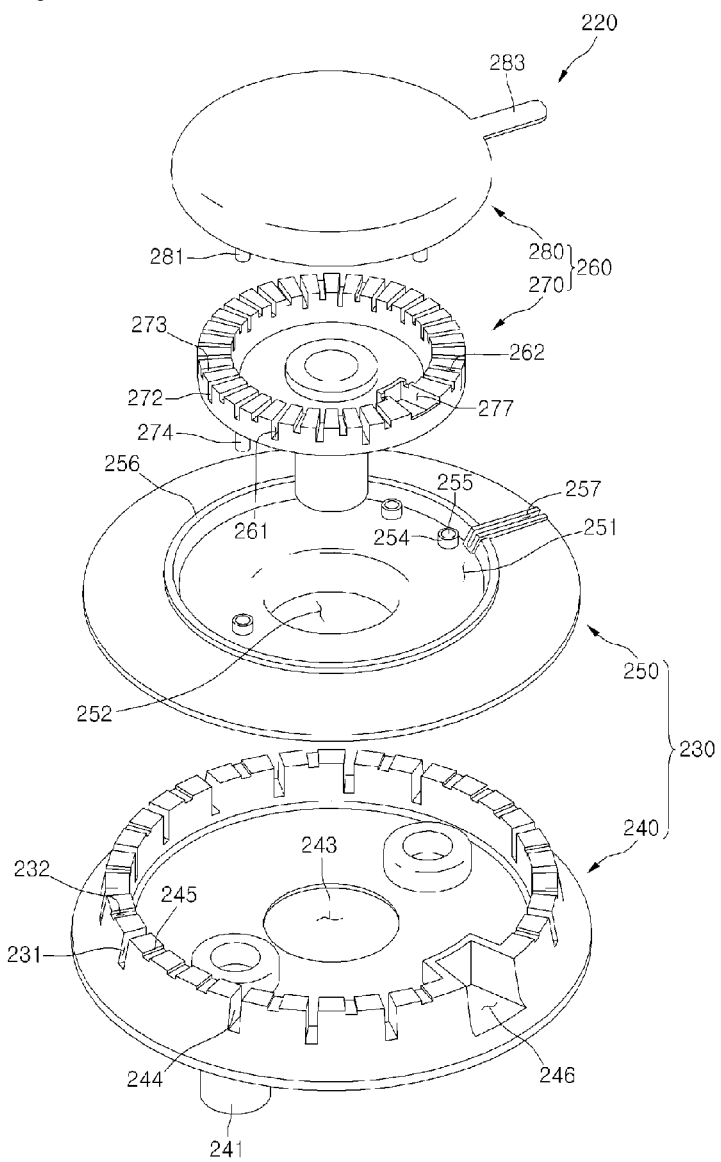
FIG. 2 is an exploded perspective view of the first embodiment of the present invention.
Figure 3:
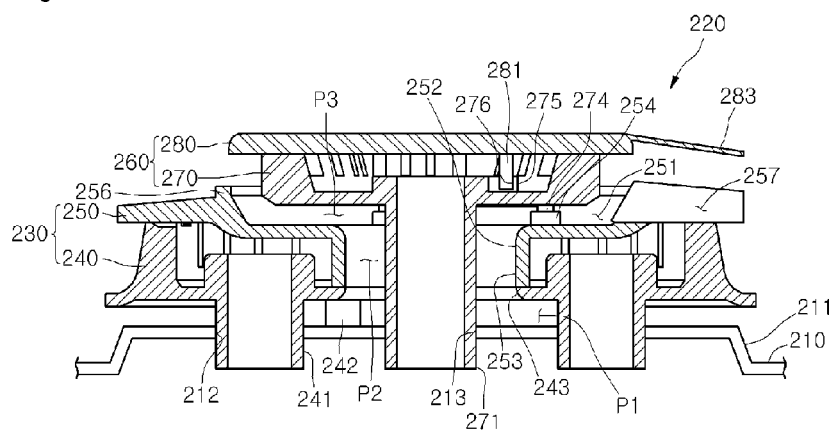
FIG. 3 is a longisectional view of the first embodiment of the present invention.

FIG. 1 is a perspective view of a cooker including a first embodiment of a top burner according to the present invention, FIG. 2 is an exploded perspective view of the first embodiment of the present invention, and FIG. 3 is a longisectional view of the first embodiment of the present invention.

Referring to FIG. 1, a main body 100 defines the exterior of a cooker 10 according to the present invention. Also, the main body 100 is provided with a top burner portion 200, an oven portion 300, a warming drawer 400, a back guard 500, a control panel 600, and a top burner controlling portion 700.

The top burner portion 200 and the oven portion 300 are where cooking of food occurs. Also, the warming drawer 400 is for warming a container in which food is contained. The control panel 600 is for receiving control signals for operating the cooker 10, and for displaying various data on the operation of the cooker 10 to the outside. The top burner controlling portion 700 is for opening and closing valves that supply gas to the top burner portion 200, and the back guard 500 is for guiding combusted gas generated during cooking of food in the oven portion 300.

More specifically, the top burner portion 200 is provided on the top portion of the main body 100. The top burner portion 200 is provided with a plurality of top burners 220. The top burners 220 are for heating containers in which food is contained by combusting gas, and a detailed description on the top burners 220 will be provided below.

Also, a plurality of top grids 290 is provided on the top burner portion 200. Containers that are heated by the top burners 220 are placed seated on the top grids 290.

The oven portion 300 is provided at the central portion below the top burner portion 200 of the main body 100. A cooking compartment (not shown), for cooking food by means of a heater (not shown), is provided inside the oven portion 300. Also, the cooking compartment is selectively opened and closed by a door 310. The door 310 selectively opens and closes the cooking compartment by pivoting its upper end up and down about its lower end on the main body 100. A door handle 320 is provided on the front, upper end of the door 310, for a user to grasp when opening and closing the door 310.

Also, the warming drawer 400 is provided at the lower portion of the main body 100 below the oven portion 300. The warming drawer 400 is installed in a drawer configuration to be capable of being inserted into and withdrawn from the main body 100. A container containing food is placed in the warming drawer 400, and the container placed in the warming drawer 400 is warmed by heat from the heater in the cooking compartment for cooking food or from a separately provided warming heater. The front surface of the warming drawer 400 is also provided with a drawer handle 410 for a user to grasp when withdrawing or inserting the warming drawer 400.

The back guard 500 is provided at the top, rear end of the main body 100 to the rear of the top burner portion 200. The back guard 500 extends upward from the top surface of the main body 100. Also, a passage communicating with the cooking compartment is provided within the back guard 500. Accordingly, combusted gas from the oven portion 300—or more particularly, combusted gas generated during cooking of food in the cooking compartment—flows through the passage and is exhausted to the outside of the cooking compartment.

The control panel 600 is provided on the front surface of the back guard 500. The control panel 600 is actually provided with an input portion that receives various input control signals for operating the oven portion 300 or the warming drawer 400, and a display portion for displaying various information on the operation of the oven portion 300 and the warming drawer 400 to the outside.

In addition, a plurality of control knobs 710 is provided on the top burner controlling portion 700 corresponding to the number of top burners 220. The control knobs 710 selectively open and close valves for supplying gas to the top burners 220, respectively.

A top plate 210 defines the top, outer surface of the top burner portion 200. Also, a burner installing portion 211 is provided on the top plate 210 to install the top burner 220. The burner installing portion 211 is formed projecting upward so that a portion of the top plate 210 forms an approximately circular cross-section. Therefore, the top surface of the burner installing portion 211 is actually disposed above the top surface of the top plate 210. Also, the perimetric surface of the burner installing portion 211 is formed sloped downward from the top surface perimeter of the burner installing portion 211.

Referring to FIGS. 2 and 3, a first and second insertion hole 212 and 213 are defined in the top plate 210. The first and second insertion holes 212 and 213 of the top plate 210 are portions in which a first and second mixing tube 241 and 271 (to be described below) are inserted. The first and second insertion holes 212 and 213 of the top plate 210 are defined cut into portions of the burner installing portion 211.

The top burner 220 includes an outer burner 230 and an inner burner 260. The outer burner 230 and inner burner 260 selectively operate according to the cooker. In the present embodiment, only the outer burner 230 operates during simmer mode (in which food is heated at a low temperature), and the outer burner 230 or/and the inner burner 260 are operated in general cooking mode. Also, the outer burner 230 and inner burner 260 include an outer burner head 240 and an outer burner cap 250, and an inner burner head 270 and an inner burner cap 280, respectively. The outer burner head 240, outer burner cap 250, inner burner head 270, and inner burner cap 280 may, for example, be cast from an aluminum material.

The outer burner head 240 is formed to have an approximately circular cross section. Also, the outer burner head 240 is seated on the top surface of the burner installing portion 211.

The outer burner head 240 is provided with 2 first mixing tubes 241. The first mixing tubes 241 is for supplying a mixture of gas discharged from a nozzle (not shown) provided within the top burner 200 below the top plate 210 and air (hereinafter called a 'gas mixture') to the outer burner 230. The top portion of the first mixing tube 241 extends upward from the top surface of the outer burner head 240. Also, the lower end of the first mixing tube 241 extends downward from the undersurface of the outer burner head 240 and is inserted in the first insertion hole 212 of the top plate 210.

Three supporting projections 242 are provided on the undersurface of the outer burner head 240. The supporting projections 242 function to support the outer burner head 240 on the top surface of the burner installing portion 211. Thus, the undersurface of the outer burner head 240 is separated from the top surface of the burner installing portion 211 by the height of the supporting projections 242.

Also, a through-opening 243 is defined in the central portion of the outer burner head 240. The through-opening 243 of the outer burner head 240 is a portion through which the second mixing tube 271 passes. Here, the through-opening 243 of the outer burner head 240 is formed comparatively wider than the diameter of the second mixing tube 271. That is, the inner periphery of the through-opening 243 of the outer burner head 240 is spaced apart from the outer periphery of the second mixing tube 271.

A plurality of main flame hole defining teeth 244 and auxiliary flame hole defining teeth 245 are provided on an inner perimeter of the top surface of the outer burner head 240. The main flame hole defining teeth 244 and the auxiliary flame hole defining teeth 245 of the outer burner head 240 are for defining main flame holes 231 and auxiliary flame holes 232, respectively, of the outer burner 230, at which gas mixture is discharged and combusted. The main flame hole defining teeth 244 of the outer burner head 240 are formed more vertically elongated than the auxiliary flame hole defining teeth 245 of the outer burner head 240.

Further, an igniting low portion 246 is defined in a side of the outer perimeter on the top surface of the outer burner head 240. The igniting low portion 246 is a portion at which the end of a spark plug (not shown) that generates a spark is disposed. That is, ignition first occurs at a main flame hole 231 and an auxiliary flame hole 232 of the outer burner 230 proximate to the igniting low portion 246, and the ignited flames spread so that gas mixture exhausted from the main flame holes 231 and auxiliary flame holes 232 of the outer burner 230 are ignited in its entirety.

The outer burner cap 250 is seated on the top surface of the outer burner head 240. The outer burner cap 250 is also shaped in an approximately circular plate shape corresponding to the outer burner head 240. The outer perimeter of the undersurface of the outer burner cap 250, together with the main flame hole defining teeth 244 and the auxiliary flame hole defining teeth 245 of the outer burner head 240, define the main flame holes 231 and auxiliary flame holes 232 of the outer burner 230.

An inner burner seat 251 is defined in the upper surface of the outer burner cap 250. The inner burner seat 251 is defined through the central portion of the outer burner cap 250 being downwardly and inwardly recessed. Here, the inner burner seat 251 is formed in an approximately circular shape being concentric to the outer burner cap 250.

Also, a through-opening 252 is defined in the outer burner cap 250. The through-opening 252 of the outer burner cap 250, like the through-opening 243 of the outer burner head 240, has the second mixing tube 271 passed therethrough. The through-opening 252 of the outer burner cap 250 is defined by cutting a portion of the inner burner seat 251.

Further, a supporting rib 253 is provided on the outer burner cap 250. The supporting rib 253 is for supporting the outer burner cap 250 on the top surface of the outer burner head 240. The supporting rib 253 extends downward from the undersurface of the outer burner cap 250 at the inner perimeter of the through-opening 252 of the outer burner cap 250—that is, from the undersurface of the inner burner seat 251. Also, the supporting rib 253 is supported on the top surface of the outer burner head 240 at the inner perimeter of the through-opening 243 of the outer burner head 240.

A fixing boss 254 is provided on the outer burner cap 250. The fixing boss 254 of the outer burner cap 250 is for fixing the outer burner cap 250 and the inner burner head 270. The fixing boss 254 of the outer burner cap 250 is provided in duplicate on the top surface of the inner burner seat 251. Also, a fixing hole 255 is defined in the fixing boss 254 of the outer burner cap 250. The fixing hole 255 of the outer burner cap 250 is a portion in which a fixing projection 274 (to be described below) of the inner burner head 270 is inserted.

An inflow preventing ridge 256 is provided on the top surface of the outer burner cap 250. The inflow preventing ridge 256 is for preventing liquids, etc. generated during cooking of food from flowing in through the through-opening 252 of the outer burner cap 250 and the through-opening 243 of the outer burner head 240. In the present embodiment, the inflow preventing ridge 256 is formed to physically extend a predetermined height from the boundary between the inner burner seat 251 and the outer burner head 240 with the exception of the inner burner seat 251.

Also, in order to transfer flames at the outer burner 230—that is, flames generated by combustion of gas mixture at the main flame holes 231 and auxiliary flame holes 232 of the outer burner 230—to a flame hole 261 of the inner burner 260, a flame transfer slit 257 is provided on the outer burner cap 250. The flame transfer slit 257 is physically defined by cutting a portion of the upper surface of the outer burner cap 250 radially.

The inner burner head 270 is seated on the outer burner cap 250, or in actuality, the inner burner seat 251. Also, the inner burner head 270 has an approximately circular cross section corresponding to the inner burner seat 251.

One second mixing tube 271 is provided on the inner burner head 270. The second mixing tube 271 is for supplying a gas mixture to the inner burner 260. The top end of the second mixing tube 271 extends upward from the top surface of the inner burner head 270. The bottom end of the second mixing tube 271 extends downward from the undersurface of the inner burner head 270, passes sequentially through the through-opening 252 of the outer burner cap 250 and the through-opening 243 of the outer burner head 240, and inserts in the second insertion hole 213.

A plurality of main flame hole defining teeth 272 and auxiliary flame hole defining teeth 273 are provided on the inner perimeter at the top surface of the inner burner head 270. Thus, the main flame hole defining teeth 272 and the auxiliary flame hole defining teeth 273 of the inner burner head 270 are for defining main flame holes 261 and auxiliary flame holes 262, respectively, of the inner burner 260, through which gas mixture is discharged and combusted.

Further, three fixing projections 274 are provided on the undersurface of the inner burner head 270. The fixing projections 274 of the inner burner head 270 are for fixing the outer burner cap 250 and the inner burner head 270. The fixing projections 274 of the inner burner head 270 are inserted in the fixing holes 255 of the outer burner cap 250, with the inner burner head 270 seated on the top surface of the outer burner cap 250.

Also, with the fixing projections 274 of the inner burner head 270 inserted in the fixing holes 255 of the outer burner cap 250, the undersurface of the inner burner head 270 is attached to the top surfaces of the fixing bosses 254 of the outer burner cap 250. Accordingly, the top surface of the outer burner cap 250 and the undersurface of the inner burner head 270 are separated from one another by a predetermined gap.

Three fixing bosses 275 are provided on the top surface of the inner burner head 270. Also, fixing holes 276 are defined in the fixing bosses 275 of the inner burner head 270. The fixing bosses 275 and fixing holes 276 of the inner burner head 270 are for fixing the inner burner head 270 with the inner burner cap 280.

Further, a gas chamber 276 is provided in the inner burner head 270. Gas mixture is stored in the gas chamber 276 for being re-ignited when flames are extinguished at the main flame hole 261 and auxiliary flame hole 262 of the inner burner 260.

The inner burner cap 280 is supported on the top surface of the inner burner head 270. The undersurface of the inner burner cap 280 functions to define the main flame holes 261 and auxiliary flame holes 262 of the inner burner 260 that are between the main flame hole defining teeth 272 and auxiliary flame hole defining teeth 273 of the inner burner head 270. Also, with the inner burner cap 280 supported on the top surface of the inner burner head 270, the undersurface of the inner burner cap 280 is separated a predetermined distance from the top end of the second mixing tube 271.

Three fixing projections 281 are provided on the undersurface of the inner burner cap 280. The fixing projections 281 of the inner burner cap 280 extend downward from the undersurface of the inner burner cap 280, and are inserted in the fixing holes 276 of the inner burner head 270, with the inner burner cap 280 mounted on the top surface of the inner burner head 270.

Also, a sealing rib 283 is provided on the inner burner cap 280. The sealing rib 283 functions to prevent inflow of liquids from objects to be heated from entering the flame transfer slit 257. For this end, the sealing rib 283 physically extends in a radial direction from the outer perimeter of the inner burner head 270 to be disposed directly above the flame transfer slit 257.

In order to combust gas mixture at the main flame holes 261 and auxiliary flame holes 262 of the inner burner 260, predetermined passages are provided in the inner burner 260 to further circulate air. The passages include first to third passages P1, P2, and P3. The first passage P1 is defined between the top surface of the burner installing portion 211 and the undersurface of the outer burner head 240 (which are separated by a predetermined gap from one another). Also, the second passage P2 is defined between the outer periphery of the second mixing tube 271 and the inner surface of the second supporting rib 253. The third passage P3 is defined between the top surface of the outer burner cap 250 and the undersurface of the inner burner head 270. In further detail, air that flows in through the first passage P1 flows through the second and third passages P2 and P3 and is supplied to the inner burner 260—that is, the main flame holes 261 and auxiliary flame holes 262 of the inner burner 260.

Below, a detailed description will be provided on the functions of the first embodiment of the top burner and the cooker including the top burner, according to the present invention, with reference to the attached drawings.

Figure 4:
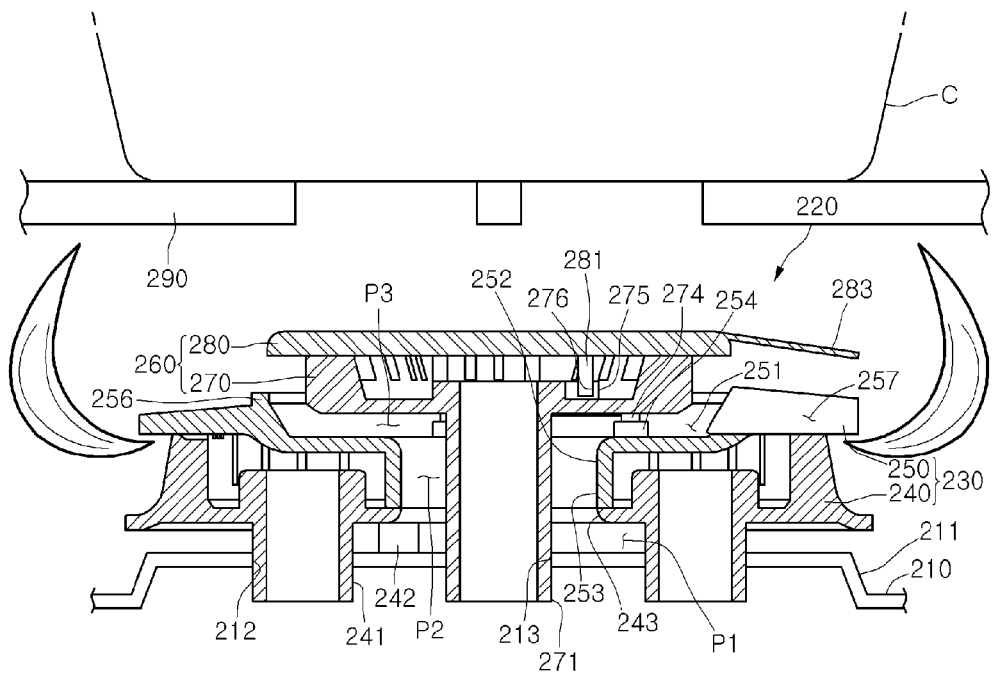
FIGS. 4 and 5 are longisectional views showing the first embodiment of a top burner according to the present invention during use.
Figure 5:
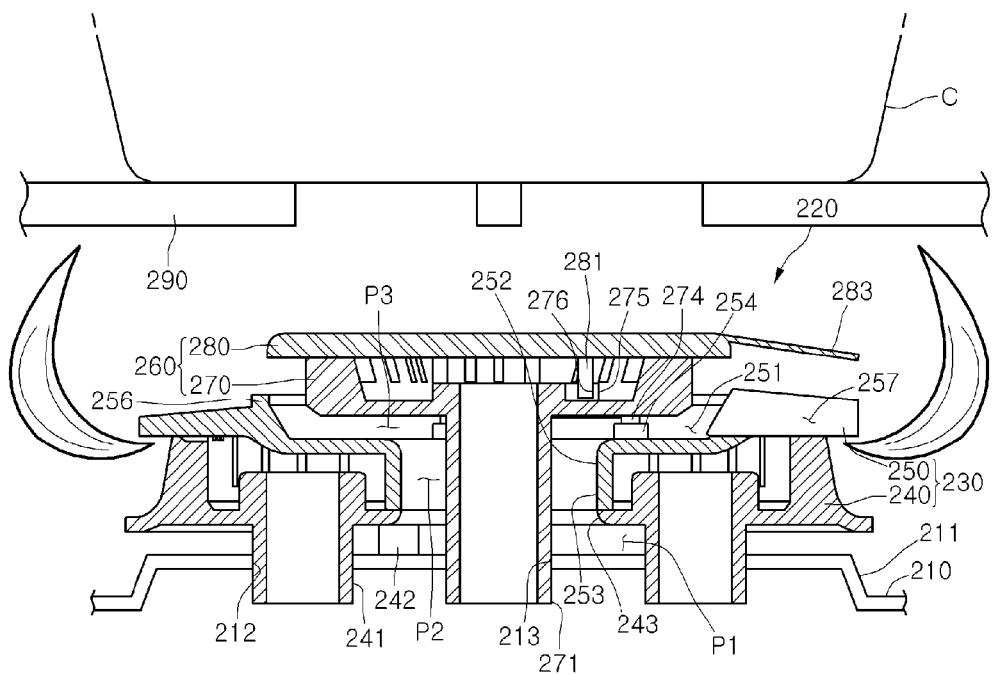

FIGS. 4 and 5 are longisectional views showing the first embodiment of a top burner according to the present invention during use.

First, referring to FIG. 4, in simmer mode, only the outer burner 230 is used to cook food. That is, when a user manipulates a control knob 710 (in FIG. 1), gas mixture is supplied through the first gas mixing tube 241 to the outer burner 230. Thus, supplying of gas mixture to the inner burner 260 through the second gas mixing tube 271 does not occur. Then, the gas mixture supplied to the outer burner 230 through the first gas mixing tube 241 is discharged through the main flame holes 231 and auxiliary flame holes 232 of the outer burner 230.

In this state, the gas mixture discharged through the main flame holes 231 and auxiliary flame holes 232 of the outer burner 230 is ignited by a spark generated from the operation of a spark plug through a user's manipulation. Accordingly, flames formed from ignition of the gas mixture discharged from the main flame holes 231 and auxiliary flame holes 232 of the outer burner 230 heat a container C seated on the top grid 290 to cook food.

Referring to FIG. 5, both the outer burner 230 and the inner burner 260 are used in general cooking mode. That is, when a user manipulates the control knob 710, gas mixture is supplied through the first and second mixing tubes 241 and 271 to the outer burner 230 and the inner burner 260. The gas mixture supplied to the outer burner 230 and inner burner 260 is discharged through the main flame holes 231 and auxiliary flame holes 232 of the outer burner 230, and the main flame holes 261 and auxiliary flame holes 262 of the inner burner 260, respectively.

Next, the gas mixture discharged through the main flame holes 231 and auxiliary flame holes 232 of the outer burner 230 is ignited first by a spark generated from the spark plug. Then, the flames generated from ignition of gas mixture at the main flame holes 231 and auxiliary flame holes 232 of the outer burner 230 are transferred through the flame transfer slit 257 to the main flame holes 261 and auxiliary flame holes 262 of the inner burner 260, and gas mixture discharged through the main flame holes 261 and auxiliary flame holes 262 of the inner burner 260 is ignited.

Accordingly, the container C seated on the top grid 290 is heated by flames formed through ignition of gas mixture discharged from the main flame holes 231 and auxiliary flame holes 232 of the outer burner 230, and the main flame holes 261 and auxiliary flame holes 262 of the inner burner 260. Here, air flowing through the first to third passages P1, P2, and P3 is supplied to the inner burner 260 to enable gas mixture to completely combust at the inner burner 260.

In the above-described simmer mode or general mode, food contained in the container C—particularly, liquid from the food—can be overheated and overflow. Such liquid of food that overflows from the container C either flows onto the top surface of the outer burner 230 (that is, the top surface of the outer burner cap 250), or flows along the top surface of the inner burner 260 (that is, the top surface of the inner burner cap 280) down to the top surface of the outer burner cap 250. In the present embodiment, however, the inflow preventing ridge 256 is provided on the top surface of the outer burner cap 250. Therefore, liquid from food that overflows from the container C during cooking of food is prevented from flowing down the outer burner cap 250, and flowing through the first to third passages P1, P2, and P3 to inhibit the flow of air supplied to the inner burner 260.

Also, because the flame transfer slit 257 is sealed by the sealing rib 283, even if liquid from food contained in the container C overflows, the overflowing liquid is prevented from entering the flame transfer slit 257. Thus, impeding of flame transfer to the inner burner 260 by liquid from food that overflows from the container C can be prevented.

Mode for the Invention

Below, a detailed description will be provided of a second embodiment of a top burner and a cooker including the top burner, according to the present invention, with reference to the attached drawings.

FIG. 6 is a longisectional view of a second embodiment of a top burner according to the present invention, and FIG. 7 is a plan view of the undersurface of an outer burner head configuring the second embodiment of the present invention. Reference numerals in FIGS. 1 to 5 for elements described above in the first embodiment of the present invention will be used for like elements in the present embodiment, and detailed description thereof will be omitted.

Referring to FIGS. 6 and 7, in the present embodiment, a first air guide 247 is provided at the bottom of the periphery of the outer burner head 240, at the main flame hole defining tooth 244 and the auxiliary flame hole defining tooth 245 of the outer burner head 240. The first air guide 247 functions to guide air to a space (the first passage P1) between the top surface of the burner installing portion 211 and the undersurface of the outer burner head 240, in order to reduce incomplete combustion at the inner burner 260.

The first air guide 247 extends in a radial direction from the bottom of the periphery of the outer burner head 240. Here, the outer perimeter of the first air guide 247 may be disposed outside and above the perimeter of the burner installing portion 211. Also, the first air guide 247 extends in a downward slope from the bottom of the periphery of the outer burner head 240, corresponding to the periphery of the burner installing portion 211. Referring to Table 1 below, a clear difference can be seen in the amount of carbon monoxide generated in the presence and absence of the first air guide 247.

TABLE 1

| Provision of First Air Guide | Quantity of Generated Carbon Monoxide (CO)(PPM in 20% Oxygen ($O_2$)) |
|---|---|
| First Air Guide Provided | 318 |
| First Air Guide Not Provided | 435 |

As shown in Table 1, in the case where the first air guide 247 is provided, when compared to the related art that is not provided with the first air guide 247, it is apparent that there is a significant reduction in the quantity of carbon monoxide generated during combusting, due to incomplete combustion of gas mixture at the top burner 220 and especially at the inner burner 260.

Also, a plurality of second air guides 248 is provided on the undersurface of the outer burner head 240. The second air guides 248 also function to reduce incomplete combustion at the inner burner 260, by partitioning a space between the top surface of the burner installing portion 211 and the undersurface of the outer burner head 240—or air flowing in the first passage P1 that is supplied to the inner burner 260 through the through-opening 243 of the outer burner head 240. In further detail, by partitioning and guiding air admitted radially into a circular space defined between the top surface of the burner installing portion 211 and the undersurface of the outer burner head 240, the second air guide 248 physically prevents the formation of eddies. For this end, the second air guide 248 extends downward from the undersurface of the outer burner head 240. Also, with reference to FIG. 7, the second air guide 248 is disposed radially about the through-opening 243 of the outer burner head 240 separated at preset central angles. Also, the undersurface of the second air guide 248 extends in an upward slope toward the through-opening 243 of the outer burner head 240. Accordingly, the second air guide 248 is formed to have physical sides in approximately trapezoidal shapes, and only a portion of the undersurface of the second air guide 248 is supported on the top surface of the burner installing portion 211. Referring to Table 2 below, a clear difference can be seen in the amount of carbon monoxide generated in the presence and absence of the second air guide 248.

TABLE 2

| Provision of Second Air Guide | Quantity of Generated Carbon Monoxide (CO)(PPM in 20% Oxygen ($O_2$)) |
|---|---|
| Second Air Guide Provided | 277 |
| Second Air Guide Not Provided | 435 |

As shown in Table 2, in the case where the second air guide 248 is provided, when compared to the related art that is not provided with the second air guide 248, it is apparent that there is a significant reduction in the quantity of carbon monoxide generated during combusting, due to incomplete combustion of gas mixture at the top burner 220 and especially at the inner burner 260.

In other words, in the present embodiment, the first air guide 247 is actually provided at the bottom periphery of the outer burner head 240 at the entrance of the first passage P1, and the second air guide 248 is actually provided at the undersurface of the outer burner head 240 atop the first passage P1. Therefore, airflow in the first to third passages P1, P2, and P3—in particular, airflow into the first passage P1, and airflow within the first passage P1—is guided by the first air guide 247, and is partitioned by the second air guide 248, respectively.

Below, a detailed description will be provided of a third embodiment of a top burner and a cooker including the top burner, according to the present invention, with reference to the attached drawings.

Figure 9:
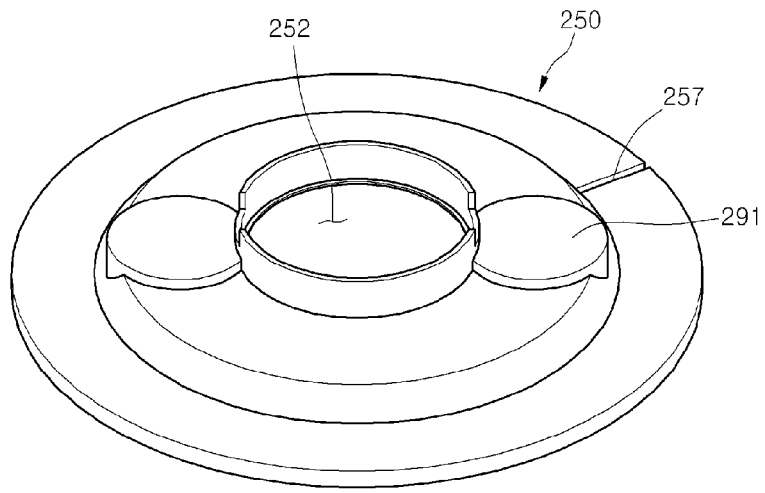
FIG. 9 is a perspective view of the undersurface of an outer burner cap configuring the third embodiment of the present invention.

FIG. 8 is a longisectional view of a third embodiment of a top burner according to the present invention, and FIG. 9 is a perspective view of the undersurface of an outer burner cap configuring the third embodiment of the present invention. Reference numerals in FIGS. 1 to 5 for elements described above in the first embodiment of the present invention will be used for like elements in the present embodiment, and detailed description thereof will be omitted.

Referring to the diagrams, in the present embodiment, a mixing boss 291 is provided on the undersurface of the outer burner cap 250 directly above the first mixing tube 241. The mixing boss 291 increases the air-to-gas ratio of gas mixture supplied to the outer burner 230 through the first mixing tube 241, in order to reduce incomplete combustion at the outer burner 230. The mixing boss 291 projects downward from the undersurface of the outer burner cap 250 directly above the first mixing tube 241. The mixing boss 291 may have at least one portion vertically overlapping the first mixing tube 241, and preferably, may vertically overlap the entirety of the first mixing tube 241.

In more detail, the inner space of the outer burner 230 between the top surface of the first mixing tube 241 and the undersurface of the mixing boss 291 may actually have a smaller volume compared to another adjacent portion of an inner space of the outer burner 230. In other words, the inner space of the outer burner 230 between the top of the first mixing tube 241 and the undersurface of the mixing boss 291 may have the height in the direction in which gas mixture is supplied from the first mixing tube 241 to the outer burner 230 reduced by the thickness of the mixing boss 291. Accordingly, the air-to-gas mixing ratio of gas mixture that is mixed while flowing in the first mixing tube 241 and supplied into the outer burner 230 is increased, due to its flowing from a comparatively narrower space (the inner space of the outer burner 230 between the top of the first mixing tube 241 and the undersurface of the mixing boss 291) to a comparatively wider space (another portion of the inner space of the outer burner 230). Accordingly, incomplete combustion of gas mixture at the outer burner 230 can be reduced to thus reduce the amount of carbon monoxide (CO) generated. Referring to Table 3 below, a clear difference can be seen in the amount of carbon monoxide generated in the presence and absence of the mixing boss 291.

TABLE 3

| Provision of Mixing Boss | Quantity of Generated Carbon Monoxide (CO)(PPM in 20% Oxygen ($O_2$)) |
|---|---|
| Mixing Boss Provided | 252 |
| Mixing Boss Not Provided | 435 |

As shown in Table 3, in the case where the mixing boss 291 is provided, when compared to the related art that is not provided with the mixing boss 291, it is apparent that there is a significant reduction in the quantity of carbon monoxide generated during combusting, due to incomplete combustion of gas mixture at the top burner 220 and especially at the outer burner 230.

Below, a detailed description will be provided of a fourth embodiment of a top burner and a cooker including the top burner, according to the present invention, with reference to the attached drawings.

Figure 10:
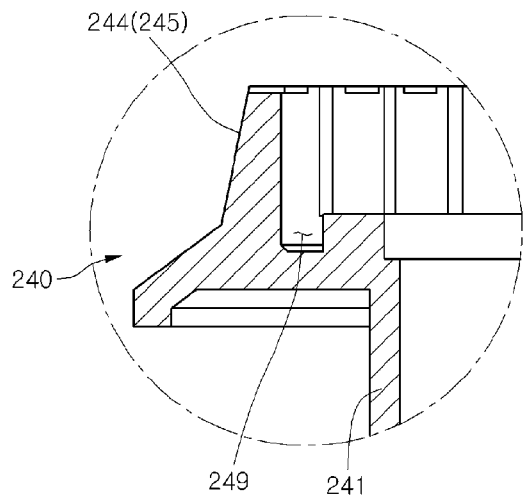
FIG. 10 is a longisectional view of an element of a fourth embodiment of a top burner according to the present invention.

FIG. 10 is a longisectional view of an element of a fourth embodiment of a top burner according to the present invention. Reference numerals in FIGS. 1 to 5 for elements described above in the first embodiment of the present invention will be used for like elements in the present embodiment, and detailed description thereof will be omitted.

Referring to FIG. 10, in the present embodiment, a mixing recess 249 is defined in the floor of the outer burner head 240 proximate to the first mixing tube 241—or more specifically—in the floor of the outer burner head 240 between the inner peripheral surface of the outer burner head 240 and the outer periphery of the first mixing tube 241. The mixing recess 249 is defined recessed downward into a portion of the floor of the outer burner head 240. In the present embodiment, the mixing recess 249 is formed to have a fan-shaped longisection overall across the periphery of the outer burner head 240 at a preset central angle. Here, the central angle of the mixing recess 249 may be set at an angle so that the distance between either end of the mixing recess 249 is at least greater than the diameter of the first mixing tube 241.

The mixing recess 249 functions to prevent gas mixture concentrating especially at the flame holes 231 and 232 of the outer burner 230 that are adjacent to the first mixing tube 241, from the flame holes 231 and 232 of the outer burner 230. In further detail, gas mixture supplied into the inner space of the outer burner 230 through the first mixing tube 241 is discharged through the flame holes 231 and 232 of the outer burner 230 and combusted. In the case of the outer burner 230, however, the distances between the first mixing tube 241 and the flame holes 231 and 232 of the outer burner 230 are different according to the positions of the flame holes 231 and 232 of the outer burner 230. Therefore, a comparatively large quantity of gas mixture may be discharged or gas mixture may be discharged at high velocity in an improperly mixed state through the flame holes 231 and 232 of the outer burner 230 adjacent to the first mixing tube 241, from among the flame holes 231 and 232 of the outer burner 230. In other words, when only flames formed from gas mixture discharged from the flame holes 231 and 232 of the outer burner 230 adjacent to the first mixing tube 241 are formed comparatively larger, the flames can interfere with each other, or imprecise combustion can occur.

In the present embodiment, as gas mixture that is supplied through the first mixing tube 241 to the inner space of the outer burner 230 flows through the mixing recess 249, its flow velocity is reduced. More specifically, gas mixture supplied through the first mixing tube 241 to the inner space of the outer burner 230 forms eddies as it flows through the mixing recess 249, so that its flow velocity is reduced and more efficient mixing of gas and air can be realized at the same time. Therefore, the above-described problem of the related art—that is, the phenomenon of a large quantity of gas mixture being discharged at high velocity through flame holes 231 and 232 of the outer burner 230 adjacent to the first mixing tube 241—can be prevented.

Below, a detailed description will be provided of a fifth embodiment of a top burner and a cooker including the top burner, according to the present invention, with reference to the attached drawings.

Figure 11:
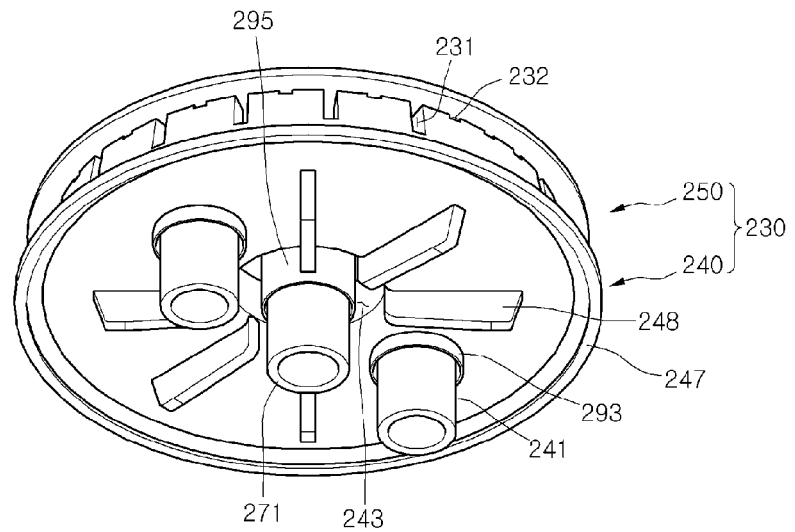
FIG. 11 is a perspective view of the undersurface of a fifth embodiment of a top burner according to the present invention.

FIG. 11 is a perspective view of the undersurface of a fifth embodiment of a top burner according to the present invention. Reference numerals in FIGS. 1 to 5 for elements described above in the first embodiment of the present invention will be used for like elements in the present embodiment, and detailed description thereof will be omitted.

Referring to FIG. 11, in the present embodiment, a plurality of first covering members 293 is provided on the undersurface of the outer burner head 240, and a second covering member 295 is provided on the undersurface of the inner burner head 270. The first and second covering members 293 and 295 function to prevent liquid from food from leaking down through the first and second insertion holes 212 and 213 of the top plate 210 that are formed by cutting portions of the burner installing portion 211 to below the top plate 210—that is, into the top burner portion 200.

In the present embodiment, the first and second covering members 293 and 295 extend downward from the undersurface of the outer burner head 240 or the undersurface of the inner burner head 270, so that the inner peripheries thereof are separated by a predetermined gap from the outer peripheries of the first and second mixing tubes 241 and 271, respectively. In other words, the first and second covering members 293 and 295 are provided on the undersurface of the outer burner head 240 or the undersurface of the inner burner head 270 to enclose the first or second mixing tube 241 or 271, respectively. Also, the first and second covering members 293 and 295 are supported on the top surface of the burner installing portion 211 proximate to the first or second insertion hole 212 or 213, respectively. That is, the first and second covering members 293 and 295 cover the first or second insertion hole 212 or 213 of the top plate 210. For this end, the first and second covering members 293 and 295 may be formed in a cylindrical shape with a diameter exceeding the diameters of the first or second insertion hole 212 or 213 of the top plate 210. Accordingly, even if liquid from food should overflow, the liquid can be prevented from flowing into the top burner portion 200 through the first and second insertion holes 212 and 213.

Below, a detailed description will be provided of a sixth embodiment of a top burner and a cooker including the top burner, according to the present invention, with reference to the attached drawings.

Figure 12:
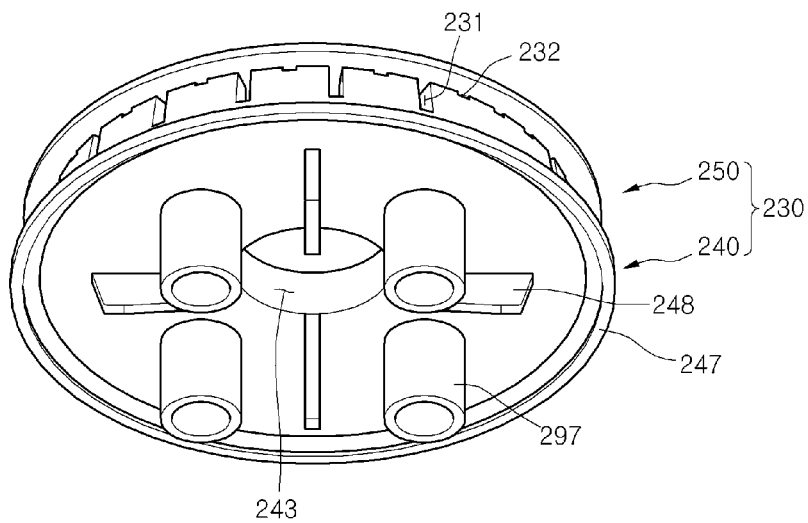
FIG. 12 is a perspective view of the undersurface of an outer burner head configuring a sixth embodiment of a top burner according to the present invention.

FIG. 12 is a perspective view of the undersurface of an outer burner head configuring a sixth embodiment of a top burner according to the present invention. Reference numerals in FIGS. 1 to 5 for elements described above in the first embodiment of the present invention will be used for like elements in the present embodiment, and detailed description thereof will be omitted.

Referring to FIG. 12, in the present embodiment, four first mixing tubes 297 are provided on the outer burner head 240. That is, gas mixture is supplied to the inner space of the outer burner 230 through the four first mixing tubes 297. The first mixing tubes 297 are disposed on the undersurface of the outer burner head 240 separated by a preset angle (that is, by 90°) from one another. Here, the first mixing tubes 297 are disposed alternatingly with the second air guides 248.

Thus, according to the present embodiment, the first mixing tubes 297 enable a large quantity of gas mixture to be uniformly supplied over the entirety of the outer burner 230. Also, because a large quantity of gas mixture is uniformly supplied over the entirety of the outer burner 230, combustion of gas mixture can be achieved more efficiently at the flame holes 231 and 232 of the outer burner 230. Further, incomplete combustion of gas mixture at the top burner 220—especially the outer burner 230—can be reduced so that the quantity of carbon monoxide (CO) generated can be reduced. Referring to Table 4 below, a clear difference can be seen in the amount of carbon monoxide generated according to the number of the first mixing tube 297.

TABLE 4

| Number of First Mixing Tube | Quantity of Generated Carbon Monoxide (CO)(PPM in 20% Oxygen ($O_2$)) |
|---|---|
| 4 First Mixing Tubes | 122 |
| 2 Second Mixing Tubes | 435 |

As shown in Table 4, when the first mixing tube 297 is configured in quadruplet, in comparison to the related art in which the first mixing tube 241 is configured in duplicate, it is apparent that there is a significant reduction in the quantity of carbon monoxide generated during combusting, due to incomplete combustion of gas mixture at the top burner 220 and especially at the outer burner 230. In other words, due to the increase in number of the first mixing tubes 297, there is not simply an increase in the supplied amount of gas mixture to the outer burner 230, but there is also a reduction in the amount of carbon monoxide generated because there is an actual reduction to incomplete combustion of gas mixture at the outer burner 230.

Below, a detailed description will be provided of a seventh embodiment of a top burner and a cooker including the top burner, according to the present invention, with reference to the attached drawings.

Figure 13:
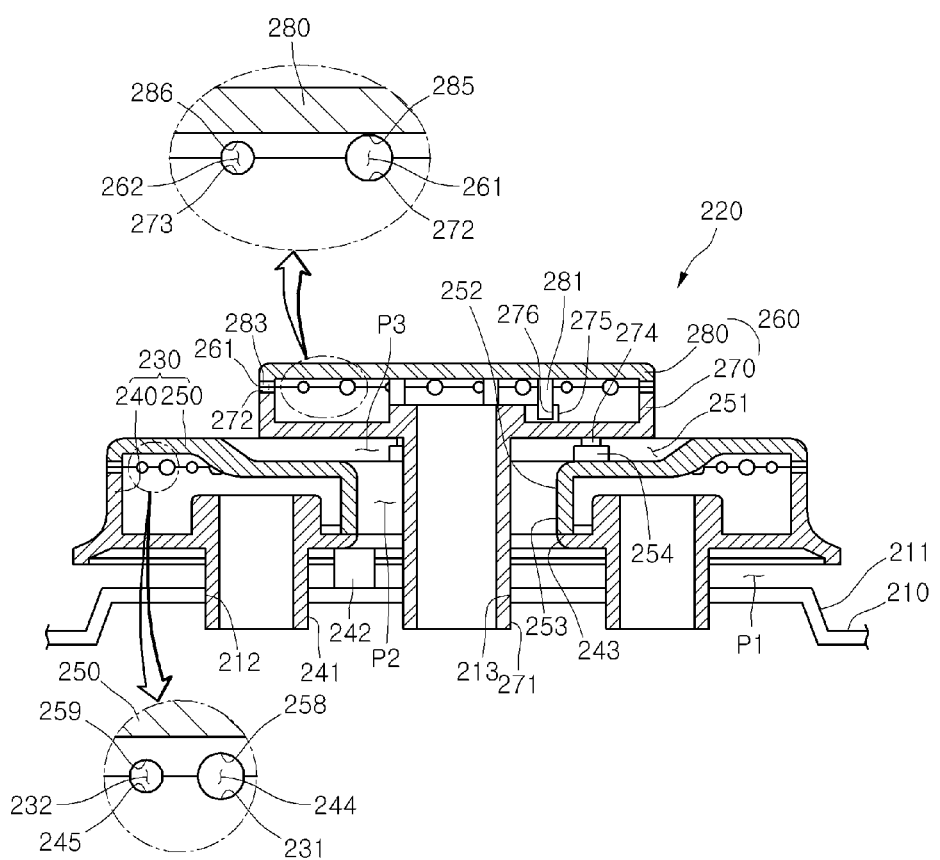
FIG. 13 is a longisectional view of a seventh embodiment of a top burner according to the present invention.

FIG. 13 is a longisectional view of a seventh embodiment of a top burner according to the present invention. Reference numerals in FIGS. 1 to 5 for elements described above in the first embodiment of the present invention will be used for like elements in the present embodiment, and detailed description thereof will be omitted.

Referring to FIG. 13, in the present embodiment, a plurality of main flame hole defining teeth 244 and auxiliary flame hole defining teeth 245 are provided in mutual alternation on the top periphery of the outer burner head 240. Also, a plurality of main flame hole defining teeth 258 and auxiliary flame hole defining teeth 259 are provided in mutual alternation on the bottom periphery of the outer burner cap 250. In addition, by engaging the main flame hole defining teeth 244 and auxiliary flame hole defining teeth 245 of the outer burner head 240 with the main flame hole defining teeth 258 and auxiliary flame hole defining teeth 259 of the outer burner cap 250, main flame holes 231 and auxiliary flame holes 232 of the outer burner 230 are respectively defined.

The main flame holes 261 and auxiliary flame holes 262 of the inner burner 260 are formed in the same way as the main flame holes 231 and auxiliary flame holes 232 of the outer burner 230. That is, a plurality of main flame hole defining teeth 272 and auxiliary flame hole defining teeth 273 are provided on the top periphery of the inner burner cap 270 in mutual alternation, and a plurality of main flame hole defining teeth 285 and auxiliary hole defining teeth 286 are provided on the top periphery of the inner burner cap 280 in mutual alternation. Accordingly, by engaging the main flame hole defining teeth 272 and the auxiliary flame hole defining teeth 273 of the inner burner cap 270 with the main flame hole defining teeth 285 and auxiliary flame hole defining teeth 286 of the inner burner cap 280, main flame holes 261 and auxiliary flame holes 262 of the inner burner 260 are defined.

Here, the main flame hole defining teeth 244 and auxiliary flame hole defining teeth 245 of the outer burner head 240, and the main flame hole defining teeth 258 and auxiliary flame hole defining teeth 259 of the outer burner cap 250 have a flow section of a semicircular shape with the same diameter in the direction of gas mixture discharged through the main flame holes 231 and auxiliary flame holes 232 of the outer burner 230, respectively. Also, the main flame hole defining teeth 272 and auxiliary flame hole defining teeth 273 of the inner burner cap 270, and the main flame hole defining teeth 285 and auxiliary flame hole defining teeth 286 of the inner burner cap 280 have a flow section of a semicircular shape with the same diameter in the direction of gas mixture discharged through the main flame holes 261 and auxiliary flame holes 262 of the inner burner 260, respectively. Accordingly, the main flame holes 231 and auxiliary flame holes 232 of the outer burner 230, and the main flame holes 261 and auxiliary flame holes 262 of the inner burner 260 are each formed having a flow section of a circular shape in the direction of gas mixture discharge, and therefore, because the flames formed from combustion of gas mixture discharged through the flame holes 231 and 232 of the outer burner 230 and the flame holes 261 and 262 of the inner burner 260 are formed of inherent shapes of the holes, aesthetics are improved by the shapes of the flames.

Below, a detailed description will be provided of an eighth embodiment of a top burner and a cooker including the top burner, according to the present invention, with reference to the attached drawings.

Figure 14:
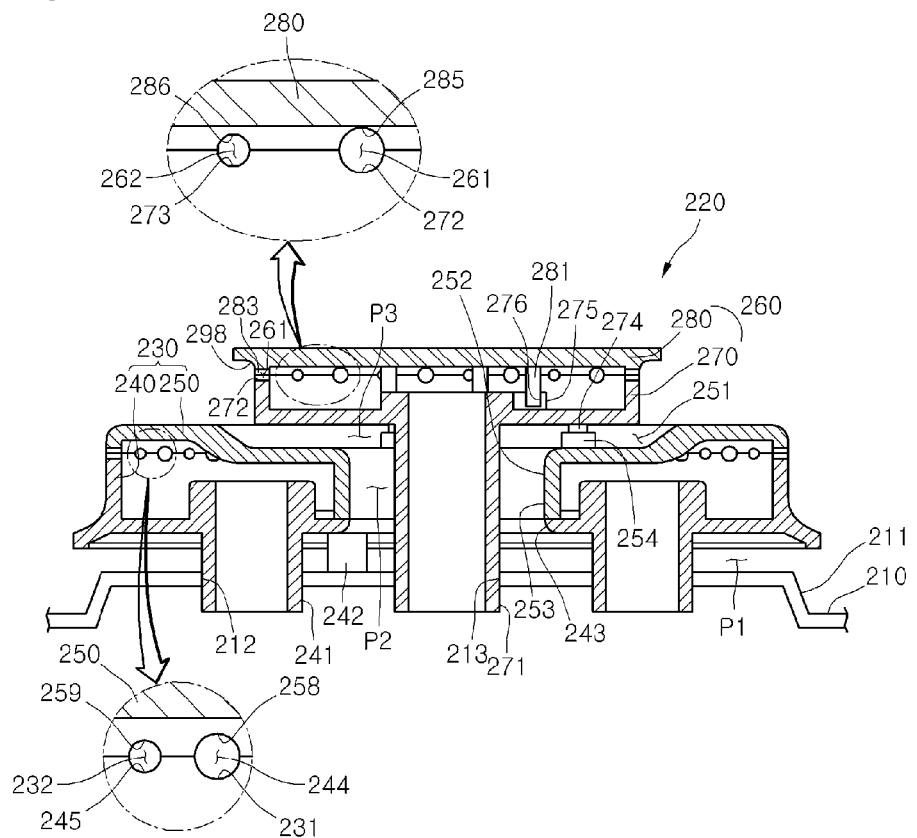
FIG. 14 is a longisectional view of an eighth embodiment of a top burner according to the present invention.

FIG. 14 is a longisectional view of an eighth embodiment of a top burner according to the present invention. Reference numerals in FIGS. 1 to 5 for elements described above in the first embodiment of the present invention will be used for like elements in the present embodiment, and detailed description thereof will be omitted.

Referring to FIG. 14, in the present embodiment, a flame guiding portion 298 is provided at the top peripheral surface of the inner burner cap 280. The flame guiding portion 298 functions to guide and diffuse flames formed through combustion of gas mixture discharged from the flame holes 261 and 262 of the inner burner 260—especially, from the main flame holes 261 of the inner burner—to the outside of the inner burner 260. Therefore, because flames that are generated from combustion of gas mixture discharged through the flame holes 261 and 262 of the inner burner 260 are guided to diffuse outward of the inner burner 260, a wider surface area of the bottom surface of a container in which food is contained can be heated. In the present embodiment, the flame guiding portion 298 is formed curved from below upward and outward in its entirety at a predetermined curvature at the top peripheral surface of the inner burner cap 280 above the flame holes 261 and 262 of the inner burner 260.

Below, a detailed description will be provided of a ninth embodiment of a top burner and a cooker including the top burner, according to the present invention, with reference to the attached drawings.

Figure 15:
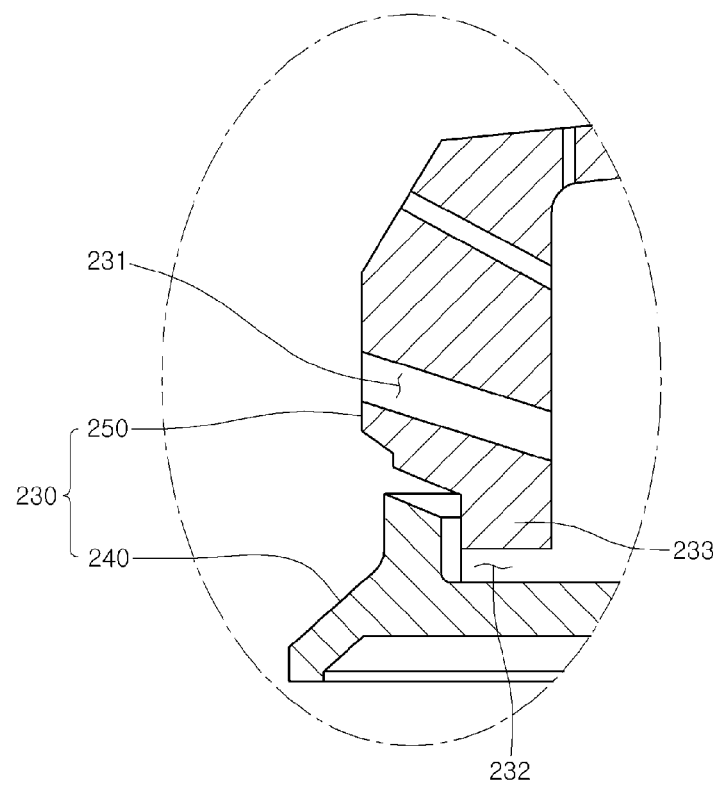
FIGS. 15 and 16 are longisectional views of elements of a ninth embodiment of a top burner according to the present invention.
Figure 16:
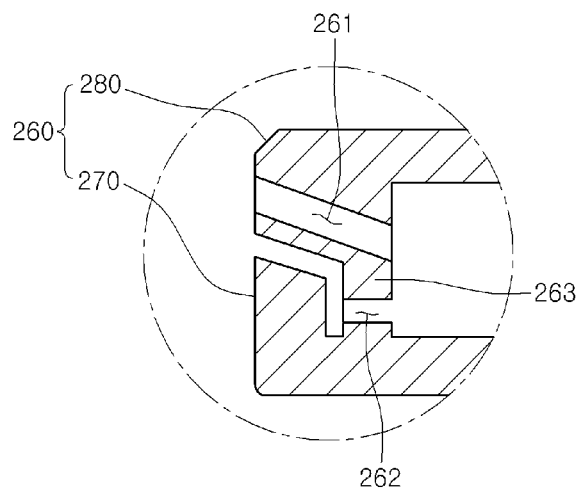

FIGS. 15 and 16 are longisectional views of elements of a ninth embodiment of a top burner according to the present invention. Reference numerals in FIGS. 1 to 5 for elements described above in the first embodiment of the present invention will be used for like elements in the present embodiment, and detailed description thereof will be omitted.

First, with reference to FIG. 15, in the present embodiment, the main flame holes 231 of the outer burner 230 are defined through the peripheral side of the outer burner cap 250 to be approximately horizontal or offset from horizontal by a preset angle. For example, through forming holes in the peripheral surface of the outer burner cap 250, the main flame holes 231 of the outer burner 230 may be defined. Here, the main flame holes 231 of the outer burner 230 have a circular flow section through which gas mixture is discharged.

Also, a plurality of auxiliary flame hole defining teeth 233 is provided at the bottom periphery of the outer burner cap 250. The auxiliary flame hole defining teeth 233 of the outer burner cap 250 are for defining the auxiliary flame holes 232 of the outer burner 230. That is, the auxiliary flame holes 232 of the outer burner 230 are actually defined by the inner perimeter on the top surface of the outer burner head 240 and the auxiliary flame hole defining teeth 233 of the outer burner cap 250. Also, the auxiliary flame holes 232 of the outer burner 230 are for transferring flames when combustion of gas mixture discharged from the main flame holes 231 of the outer burner 230 is extinguished. In other words, the auxiliary flame holes 232 of the outer burner 230 may be described as functioning to not actually cook food contained in a container, but for aiding the combusting of gas mixture at the main flame holes 231 of the outer burner 230. Accordingly, flames formed through combustion of gas mixture discharged from the auxiliary flame holes 232 of the outer burner 230 may be less visible from the outside than flames formed through combustion of gas mixture discharged from the main flame holes 231 of the outer burner 230.

Referring to FIG. 16, a plurality of main flame holes 261 of the inner burner 260 is defined in the inner burner cap 280. The inner flame holes 261 of the inner burner 260 may actually be formed through forming holes in the peripheral surface of the inner burner cap 280. The main flame holes 261 of the inner burner 260, like the main flame holes 231 of the outer cover 230, are for physically cooking food. Also, the main flame holes 261 of the inner burner 260, like the main flame holes 231 of the outer burner 230, are defined to have a circular flow section through which gas mixture is discharged.

In addition, a plurality of auxiliary flame hole defining teeth 233 is formed on the inner burner cap 280. The auxiliary flame hole defining teeth 233 of the inner burner cap 280 are for defining auxiliary flame holes 262 of the inner burner 260. That is, the auxiliary flame holes 262 of the inner burner 260 are defined by the inner perimetric top surface of the inner burner head 270 and the auxiliary flame hole defining teeth 233 of the inner burner cap 280.

Thus, according to the present embodiment, the main flame holes 231 of the outer burner 230, and the main flame holes 261 of the inner burner 260 are defined through post process hole forming to have circular flow sections in the direction in gas mixture is discharged. However, the auxiliary flame holes 232 of the outer burner 230, and the auxiliary flame holes 262 of the inner burner 260 are not exposed to the outside. Therefore, because the auxiliary flame holes 232 of the outer burner 230, and the auxiliary flame holes 262 of the inner burner 260 do not have to have circular flow sections in the direction of gas mixture discharge, they are defined, not through hole forming, but by the auxiliary flame hole defining teeth 233 of the outer burner cap 250, and the auxiliary flame hole defining teeth 263 of the inner burner cap 280.

Below, a detailed description will be provided of a tenth embodiment of a top burner and a cooker including the top burner, according to the present invention, with reference to the attached drawings.

Figure 17:
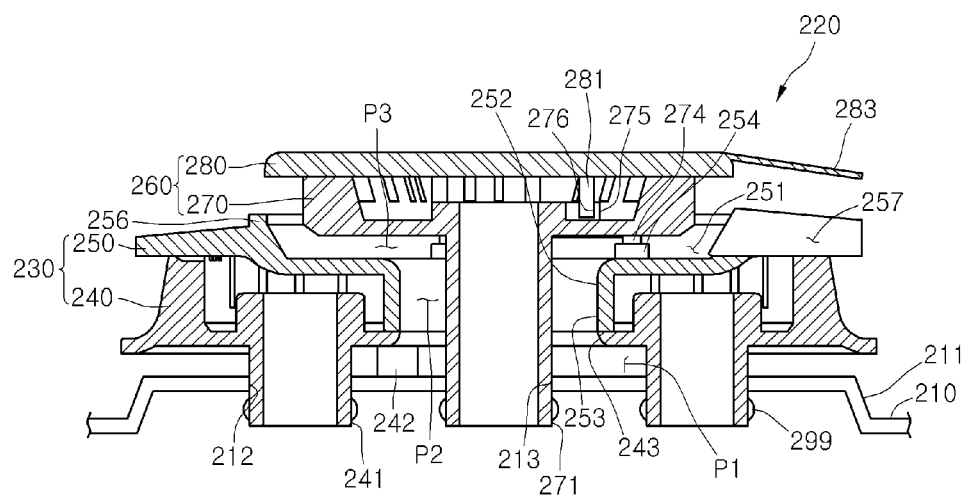
FIG. 17 is a longisectional view of a tenth embodiment of a top burner according to the present invention.

FIG. 17 is a longisectional view of a tenth embodiment of a top burner according to the present invention. Reference numerals in FIGS. 1 to 5 for elements described above in the first embodiment of the present invention will be used for like elements in the present embodiment, and detailed description thereof will be omitted.

Referring to FIG. 17, in the present embodiment, an anti-separation member 299 is provided on the outer peripheries of the first and second mixing tubes 241 and 271. The anti-separation member 299 functions to prevent arbitrary separation when the first and second mixing tubes 241 and 271 are inserted in the first and second insertion holes 212 and 213 of the top plate 210. In the present embodiment, the anti-separation members 299 are formed in the shapes of spheres with a preset radius that project from the outer peripheries of the first and second mixing tubes 241 and 271 in radial directions of the first and second mixing tubes 241 and 271. Accordingly, the first and second mixing tubes 241 and 271, when inserted into the first and second insertion holes 212 and 213 of the top plate 210, are press-fitted therein by means of the anti-separation members 299. However, when inserted in the first and second insertion holes 212 and 213 of the top plate 210, the first and second mixing tubes 241 and 271 (through the anti-separation member 299) can be separated only through an outer force greater than a preset force, in order to prevent arbitrary separation during cleaning of the top plate 210, for example.

In the present embodiment, while the anti-separation member 299 is formed projecting radially from the outer peripheries of the first and second mixing tubes 241 and 271, it is not necessarily limited thereto. For example, the anti-separation member 299 may be formed as a plate spring that elastically deforms during insertion or separation of the first and second mixing tubes 241 and 271 in or from the first and second insertion holes 212 and 213 of the top plate 210.

Thus, it will be apparent that various other modifications can be devised by those having ordinary skill in the art to fall within the basic technical scope of the present invention, and that the scope of the present invention shall be interpreted by the appended claims below.

Industrial Applicability

The top burner and cooker including the top burner configured as in the above descriptions in accordance with the present invention are projected to have the following effects.

First, in the present invention, the edge portion of a container containing food is heated by an outer burner, and the central portion is heated by an inner burner. Thus, the food can be more efficiently cooked.

Also, in the present invention, because the outer burner is used in simmer mode for heating food at low temperature, compared to using the inner burner, the surface area of the container containing food heated in simmer mode is increased. Therefore, burning of food in simmer mode can be minimized, so that food can be more conveniently cooked.

Moreover, in the present invention, gas mixture is more completely combusted at the inner burner. Thus, food can be more efficiently cooked, while detrimental effects such as the generation of carbon monoxide from incomplete combustion at the inner burner can be prevented.

In addition, in the present invention, inflow of impurities from food can be prevented by an inflow preventing ridge, a covering member, etc. Thus, the top burner and cooker can be used in cleaner conditions.

Furthermore, in the present invention, flame holes are formed to have circular flow sections in the direction of gas mixture discharge. Accordingly, flames can be retained in those inherent shapes.

Additionally, in the present invention, arbitrary separation of the top burner from the top plate can be prevented. Therefore, a user can more conveniently use the top burner.

The invention claimed is:

1. A top burner comprising:
   a first burner provided with a plurality of flame holes for forming flames through combusting gas mixture;
   a second burner installed on a top surface of the first burner, and provided with a plurality of flame holes for forming flames through combusting of gas mixture for the flames formed at the flame holes of the first burner;
   a first mixing tube for supplying gas mixture into the first burner, extended downward from the undersurface of the first burner;
   a second mixing tube for supplying gas mixture into the second burner, extended downward from the undersurface of the second burner;
   an opening formed on the first burner through which the second mixing tube passes; and
   a plurality of passages in which air flows for combusting gas mixture at the flame holes of the first and second burners,
   wherein the plurality of passages includes:
   a first passage disposed between an undersurface of the first burner and a top surface of a top plate on which the first burner is installed; and
   a second passage for air flow into the second burner defined between an inner surface of the opening and an outer periphery of the second mixing tube.

2. The top burner according to claim 1, wherein the plurality of passages includes:
   a third passage defined at least between the top surface of the first burner and the undersurface of the second burner.

3. The top burner according to claim 1, further comprising an air guide for guiding air that flows into the first passage.

4. The top burner according to claim 3, wherein the air guide extends radially from a perimetric surface bottom of the first burner.

5. The top burner according to claim 3, wherein the air guide extends radially in a downward slope from a perimetric surface bottom of the first burner.

6. The top burner according to claim 1, further comprising an air guide partitioning air that flows into the first passage.

7. The top burner according to claim 6, wherein the air guide extends downward from an undersurface of the first burner.

8. The top burner according to claim 6, wherein the air guide is disposed radially at a preset central angle apart about a through-opening defined through cutting away a portion of an undersurface of the first burner, the second mixing tube passing through the through-opening to supply gas to the second burner.

9. The top burner according to claim 6, wherein an undersurface of the air guide extends in an upward slope toward a through-opening defined through cutting away a portion of an undersurface of the first burner, the second mixing tube passing through the through-opening to supply gas to the second burner.

10. The top burner according to claim 1, further comprising:
    a first air guide guiding air that flows into the first passage; and
    a second air guide partitioning the air that flows into the first passage.

11. The top burner according to claim 10, wherein
    the first passage is defined between a top surface of a top plate having at least the first burner installed thereon, and an undersurface of the first burner,
    the first air guide guides the air flowing into the first passage radially, and
    the second air guide partitions the air flowing into the first passage radially.

12. The top burner according to claim 1, further comprising an inflow preventing member for preventing flow of impurities generated from food heated by at least one burner from the first and second burners into the one passage.

13. The top burner according to claim 12, wherein the inflow preventing member is provided on the top surface of the first burner proximate to a perimeter of the second burner.

14. The top burner according to claim 1, further comprising a mixing member for interfering with flow of gas mixture mixed with air supplied into the second burner through the second mixing tube, and enabling mixing of air and gas.

15. The top burner according to claim 14, wherein the mixing member projects from a side of an inner space of the second burner in a direction opposite to a direction in which gas mixture is supplied to the inner space of the second burner from the second mixing tube.

16. The top burner according to claim 14, wherein the mixing member projects from a side of an inner space of the second burner in a direction proximate to an end of the second mixing tube communicating with the inner space of the second burner.

17. The top burner according to claim 14, wherein the mixing member reduces a distance between a top of the second mixing tube communicating with an inner space of the second burner, and a portion of a ceiling of the inner space of the second burner that is directly above the top of the second mixing tube.

18. The top burner according to claim 14, wherein at least a portion of the mixing member overlaps with an end of the second mixing tube communicating with an inner space of the second burner, in a direction in which gas mixture is supplied to the inner space of the f second burner through the second mixing tube.

19. The top burner according to claim 1, further comprising a covering member covering an insertion hole, through which the second mixing tube that supplies gas mixture mixed with air into the second burner formed on a top plate of a cooker passes, from a space between a top surface of the top plate on which the first burner is installed and an undersurface of the first or second burner.

20. The top burner according to claim 19, wherein the covering member extends downward from the undersurface of the second burner, and has a bottom end thereof supported on the top surface of the top plate proximate to the insertion hole.

21. The top burner according to claim 19, wherein the covering member is provided on an undersurface of the second burner to be separated by a preset gap at an inner periphery thereof with an outer periphery of the second mixing tube communicating with the undersurface of the second burner.

22. The top burner according to claim 1, wherein gas mixture mixed with air that is supplied into the first burner is supplied by at three or more mixing tubes disposed by a preset angle apart about a center of an undersurface of the first burner.

23. The top burner according to claim 1, further comprising a mixing recess providing a space for mixing gas mixture mixed with air supplied into the second burner by the second mixing tube.

24. The top burner according to claim 23, wherein the second mixing tube has one end thereof communicating with an inside of the second burner, and the mixing recess is disposed inside the second burner between the one end of the second mixing tube communicating with the inside of the second burner and one or more of the flame holes of the second burner that are closest to the one end of the second mixing tube.

25. The top burner according to claim 23, wherein a top of the second mixing tube communicates with an inside of the second burner by passing through a floor of the second burner, and the mixing recess is defined through recessing downward into a portion of the floor inside the second burner, and the portion is defined by the floor inside the second burner such that the portion is between the top of the second mixing tube and at least one or more of the flame holes of the second burner proximate to the top of the second mixing tube.

26. The top burner according to claim 23, wherein the mixing recess is provided over a central angle of the second burner such that a distance between ends of the mixing recess is at least greater than a diameter of the second mixing tube.

27. The top burner according to claim 1, wherein at least one of the first and second burners comprises:
 a burner head; and
 a burner cap seated on a top surface of the burner head,
  wherein a portion of the flame holes is defined through hole processing, and a remainder of the flame holes is defined between flame hole defining teeth formed on one of the burner head and the burner cap and the other of the burner head and the burner cap.

28. The top burner according to claim 27, wherein
main flame holes of the flame holes for forming flames to heat food are defined through hole processing of the burner head or the burner cap, and
auxiliary flame holes of the flame holes for transferring flames when gas mixture discharged and combusted at the main flame holes is extinguished, the auxiliary flame holes defined by the flame hole defining teeth and one of the burner head and the burner cap.

29. The top burner according to claim 1, wherein at least one of the first and second burners comprises:
 a burner head formed with flame hole defining teeth; and
 a burner cap mounted on a top surface of the burner head, and formed with flame hole defining teeth corresponding to the flame hole defining teeth of the burner head,
 wherein through the flame hole defining teeth of the burner head and the flame hole defining teeth of the burner cap, the flame holes are given a circular flow section in a direction in which gas mixture is discharged.

30. The top burner according to claim 1, further comprising a flame guiding portion guiding and diffusing flames generated from combustion of gas mixture at the flame holes of the second burner.

31. The top burner according to claim 30, wherein the flame guiding portion is formed through a perimetric surface of the second burner being curved at a preset curvature outward and upward from below.

32. The top burner according to claim 30, wherein the second burner comprises:
 a second burner head seated on a top surface of the first burner; and
 a second burner cap seated on a top surface of the second burner head,
  wherein the flame guiding portion is formed through a perimetric surface of the second burner cap being curved at a preset curvature outward and upward from below.

33. The top burner according to claim 1, further comprising an anti-separation member for preventing arbitrary separation when the first or second burner is seated on the top plate.

34. The top burner according to claim 33, wherein the anti-separation member is a projection provided on an outer periphery of the second mixing tube supplying gas mixture mixed with air into the second burner.

35. A cooker comprising:
 a top burner unit comprising a top plate defining a top surface exterior, a top grid provided on the top plate and on which food is placed, and the top burner in claim 1; and
 an oven unit provided below the top burner.

36. A top burner comprising:
 an outer burner installed on a top surface of a top plate, and provided with a plurality of flame holes to form flames through combusting gas mixture at a perimeter thereof;
 an inner burner installed on a top surface of the outer burner, and provided with a plurality of flame holes to form flames through combusting gas mixture at a perimeter thereof disposed inward to the perimeter of the outer burner;
 a plurality of first mixing tubes supplying gas mixture mixed with air inside the outer burner;
 a second mixing tube supplying gas mixture mixed with air inside the inner burner;
 a supporting rib for supporting an outer burner cap on a top surface of an outer burner head:
 an opening formed on the outer burner and through which the second mixing tube passes; and
 a plurality of passages in which air flows for combusting gas mixture at the flame holes of the outer burner and inner burner,
 wherein the plurality of passages includes:
 a first passage disposed between an undersurface of the outer burner and a top surface of a top plate on which the outer burner is installed;
 a second passage for air flow into the outer burner defined between an inner surface of the supporting rib and an outer periphery of the second mixing tube; and
 a third passage defined between the top surface of the outer burner and an undersurface of the inner burner.

37. The top burner according to claim 36,
wherein the outer burner comprises:
the outer burner head connected to the first mixing tube; and
the outer burner cap mounted on a top surface of the outer burner head, and having the inner burner installed on a top surface thereof, and
wherein the inner burner comprises:
an inner burner head connected to the second mixing tube, and mounted on the top surface of the outer burner head; and
an inner burner cap mounted on a top surface of the inner burner head.

38. The top burner according to claim 37, wherein
a first air guide is provided at a perimetric surface of the outer burner head to guide air flowing into a first passage of the plurality of passages, and
a second air guide is provided at an undersurface of the outer burner head to partition air flowing into the first passage.

39. The top burner according to claim 38, wherein
the first passage is defined between at least the top surface of the top plate and an undersurface of the outer burner,
the first air guide radially guides the air flowing into the first passage, and
the second air guide radially partitions the air flowing into the first passage.

40. The top burner according to claim 37, wherein an inflow preventing member is formed projecting upward on the top surface of the outer burner cap proximate to a perimeter of the inner burner.

41. The top burner according to claim 37, wherein a mixing member is provided at an undersurface of the outer burner cap, to interfere with flow of gas mixture mixed with air supplied into the outer burner through at least one of the first mixing tubes, and induce mixing of air and gas.

42. The top burner according to claim 41, wherein the mixing member projects downward from the undersurface of the outer burner cap.

43. The top burner according to claim 41, wherein the mixing member reduces a distance between a top of the first mixing tube communicating with the undersurface of the outer burner head, and the undersurface of the outer burner cap.

44. The top burner according to claim 37, wherein the outer burner head and the inner burner head are each provided with a covering member on undersurfaces thereof, for covering an insertion hole defined in the top plate, through which the first and second mixing tubes pass.

45. The top burner according to claim 44, wherein each covering member extends downward from the undersurfaces of the respective outer burner head and the inner burner head, and has a bottom thereof supported on the top surface of the top plate proximate to the insertion hole.

46. The top burner according to claim 37, wherein a mixing recess is defined in a floor of the outer burner head or an undersurface of the outer burner cap, the mixing recess in which gas mixture mixed with air supplied into the outer burner or the inner burner by the first mixing tube is mixed.

47. The top burner according to claim 46, wherein tops of the first mixing tubes and the top of the second mixing tube communicate with an inside of the outer burner or the inner burner, respectively, by passing through the floor of the outer burner or inner burner, and the mixing recess is defined through recessing downward into a portion of the floor inside of the outer burner or inner burner, and the portion is defined by the floor inside the outer burner or inner burner such that the portion is between the tops of the first mixing tubes and at least one or more of the flame holes of the outer burner or proximate to the tops of the first mixing tubes or between the top of the second mixing tube and at least one or more of the flame holes of the inner burner.

48. The top burner according to claim 37, wherein
 a portion of the flame holes of the outer burner is defined through hole processing of the outer burner head or the outer burner cap, and
 a remainder of the flame holes of the outer burner is defined between flame hole defining teeth formed on one of the outer burner head and the outer burner cap, and the outer burner cap or the outer burner head.

49. The top burner according to claim 37, wherein
 a portion of the flame holes of the inner burner is defined through hole processing of the inner burner head or the inner burner cap, and
 a remainder of the the flame holes of the inner burner is defined between flame hole defining teeth formed on one of the inner burner head and the inner burner cap, and the inner burner cap or the inner burner head.

50. The top burner according to claim 37, wherein flame hole defining teeth are formed on the outer burner head and the outer burner cap, respectively, to define the flame holes of the outer burner, and through the flame hole defining teeth of the outer burner head and the flame hole defining teeth of the outer burner cap, the flame holes of the outer burner are given a circular flow section in a direction in which gas mixture is discharged.

51. The top burner according to claim 37, wherein flame hole defining teeth are formed on the inner burner head and the inner burner cap, respectively, to define the flame holes of the inner burner, and through the flame hole defining teeth of the inner burner head and the flame hole defining teeth of the inner burner cap, the flame holes of the inner burner are given a circular flow section in a direction in which gas mixture is discharged.

52. The top burner according to claim 37, wherein a flame guiding portion is formed curved at a preset curvature upward and outward from below at a perimetric surface of the inner burner head or the inner burner cap, to guide and diffuse flames generated from combustion of gas mixture at the flame holes of the outer burner.

53. A cooker comprising:
 a top burner unit comprising a top plate defining a top surface exterior, a top grid provided on the top plate and on which food is placed, and the top burner in claim 36; and
 an oven unit provided below the top burner.

54. The top burner according to claim 36, wherein the second passage is communicated with the third passage.

* * * * *